Patented Mar. 20, 1934

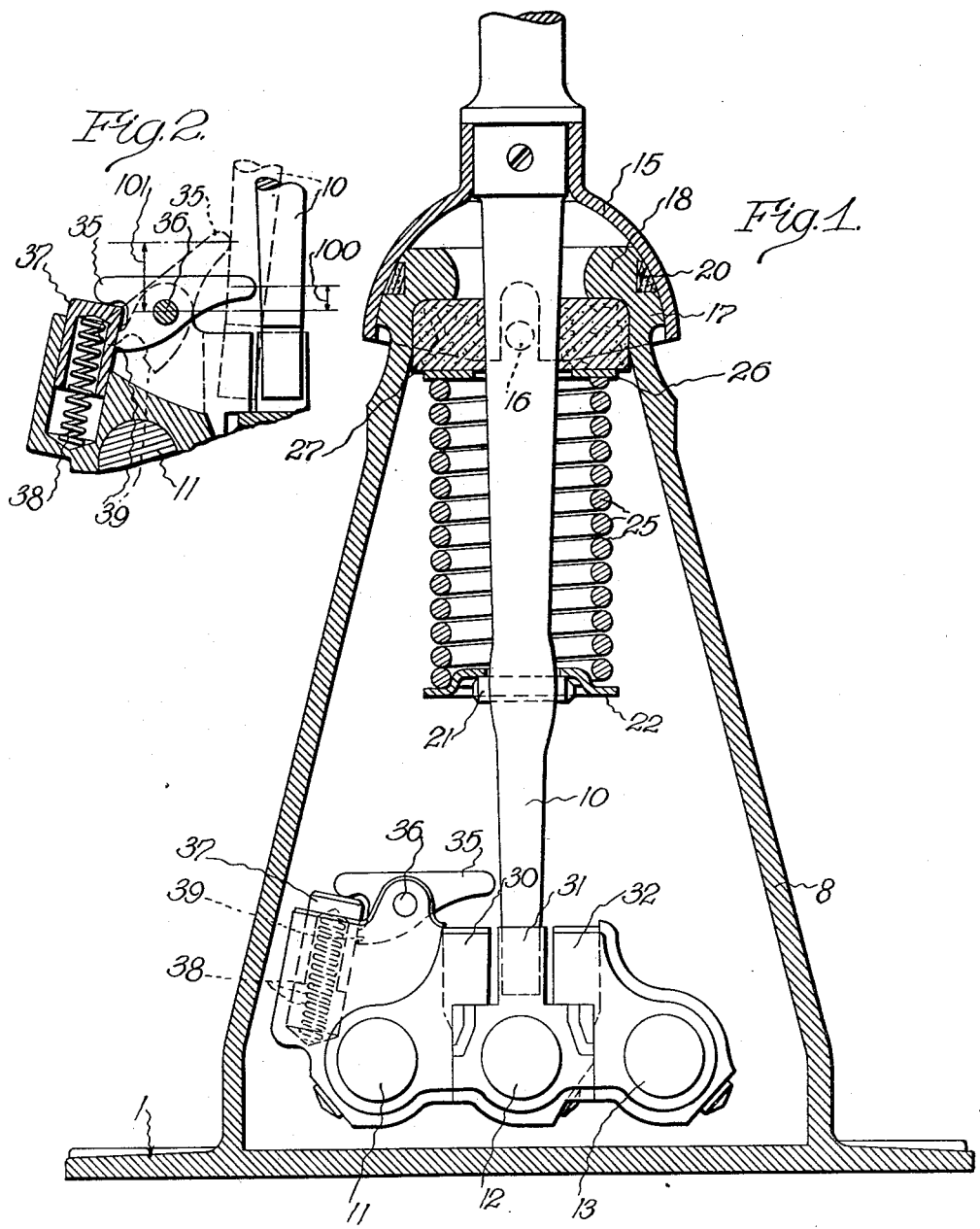

1,951,876

UNITED STATES PATENT OFFICE 1,951,876

SNAP LOCK MECHANISM FOR TRANSMISSIONS

Robert Lapsley, Berrien Springs, Mich., assignor to Clark Equipment Company, Buchanan, Mich., a corporation of Michigan Original application October 13, 1930, Serial No. 488,247. Divided and this application September 14, 1931, Serial No. 562,626

8 Claims. (Cl. 74—39)

This application is a division of my copending application filed October 13, 1930 for a Transmission, Serial No. 488,247.

The present invention relates generally to transmissions for automobiles and other vehicles, and is particularly concerned with certain improvements therein which have particular utility in transmissions having four or more speeds forward and reverse. Transmissions of this type employ three shifter rods and generally the reverse gear is controlled by the third shifter or shift rod while the forward speeds, which are by far most frequently used, are usually controlled by the other two shift rods. In some cases, however, and particularly where more than four forward speeds are provided, both the lowest stage or ratio and the reverse drive are arranged to be controlled by the same shift rod. The lowest stage or ratio is not intended, generally, to be employed for acceleration in normal driving, but is an emergency low gear for heavy duty and as such is seldom employed as compared with the other gear ratios. The same is true for reverse drive, that is, generally reverse is used quite seldom. For this reason, therefore, manufacturers have found it convenient to arrange the lowest speed forward and reverse on the same shift rod and to position this rod so that the gear shift control lever actuated by the operator must be pushed to an extreme position before reverse or lowest forward speed can be effected.

The principal purpose of the present invention is to provide a novel control feature to prevent the accidental movement of the gear shift lever. Heretofore, it has been customary in providing for the operation of an emergency low speed in a transmission or any other special connection such as reverse speed which is normally out of selective position, to provide a manually operable detent means controlled by the thumb or fingers of an operator for purposes of enabling the shifter lever to be moved to engage a shift rod operatively associated with the shifting element which is out of the normal selective positions of the transmission. In accordance with the instant invention these additional manually operable elements normally requiring additional attention on the part of the operator have been eliminated thus simplifying the operation of the transmission when shifting to the special connection when desired.

With the above in view it is an object of this invention to provide a transmission with a novel means for permitting the shifting of the elements of the transmission for special connections therein requiring only a simple shifting of the gear shift lever. To this end, the present invention contemplates a snap lock mechanism for the gear shift control lever of the transmission and operative to restrain the movement of the lever in the direction to engage the third shift rod with which reverse and low speed gear ratios are associated. Preferably the snap lock mechanism comprises a pivotally mounted snap lever, an extension thereon for engagement with said control lever, and spring operated plunger means for holding said snap lever in a certain position, the leverage of said snap lever being such as to resist and to oppose the force of said control lever by several times the load of said spring operated plunger means when the control lever is initially shifted into contact with said snap lever, while the leverage of the snap lever multiplies upon further movement of the control lever, quickly reducing the pressure required to displace the control lever into the desired position.

I wish to mention that I do not intend the general discussion of the invention, rendered previously, and the statements of objects furnished above, to limit the invention in any way. I have furnished the general description merely for providing the indispensable background necessary for understanding the various features and objects of the invention and not to show its limitations. Likewise I have furnished the statements of objects to summarize and to enumerate the features of outstanding importance. There are other features and objects which will be apparent as the description progresses.

I shall now describe the invention in detail with reference to the accompanying drawing, in which:

Figure 1 shows a cross section through the upper portion of the transmission casing and the snap lock mechanism for restraining the gear shift control lever from engaging the shift fingers on the reverse shift rod unless a particular effort is made to do so and which is sufficient to overcome the initial resistance set up by the snap lock mechanism; and Figure 2 illustrates the action of the novel snap lock mechanism in a further and more diagrammatic manner, with several parts in cross section and other parts omitted for the sake of clearness.

Referring now more particularly to Figure 1, the reference numeral 1 designates the upper part of the casing of the transmission housing which is provided with the usual extension or pedestal 8 to receive the gear shift control lever 10 enclosed therewithin. Since the various details of the transmission gears and associated structure form no part of the present invention they have not been illustrated in this application except in so far as such a mechanism is represented by the three shift rods 11, 12 and 13 controlling the selective engagement of the various gears.

The control lever 10 is provided with a semicircular cap 15, adapted to rock around point 16. The upper portion of the housing 8 is suitably shaped at 17 and 18 to fit the inside of the semicircular cap 15, providing an annular recess 20 in which a suitable packing may be placed to prevent the incidental escape of grease. A pin 21 holds a washer 22 on the control lever within the housing, providing a shoulder for the spring 25 which rests at its other end against the washer 26. The latter is in engagement with the member 27. The control lever 10 is thus located with enough play in vertical direction so that it can be freely and easily shifted.

The shifter rods 11, 12 and 13 are placed side by side, each being mounted and longitudinally movable within bearing projections as shown in Figure 1. Each shift rod is provided at its front end with shifter fingers, such as indicated by numerals 30, 31 and 32, respectively. The control lever 10 is movable from the left to the right and vice versa, so that its lower end may be registered with any of the shifter fingers, and is also movable in each position at a right angle to the plane of the drawing in Figure 1, so that each shifter finger may be engaged and operated to shift the corresponding shifter rod as desired. The control lever 10 is shown in the drawing in neutral position, its lower end being in register with the shifter fingers of shifter rod 31.

It is desirable to restrain the control lever from being shifted inadvertently into register with the shifter fingers of a certain shifter rod, for example, with the shifter rod controlling the reversing gear. Shifting to this position would only be possible if the operator actually desires to do so. A restraining force imposed on the mechanism when operated in this direction, will call the attention of the driver and prevent inadvertent gear shift. However, should the operator actually intend to shift the control lever in this direction, he may do so by exerting additional force to overcome the action of the restraining mechanism.

The shift finger 30 is, for this purpose, provided with a slot into which the lower end of the control lever 10 is adapted to enter. A snap lever 35 is pivotally mounted in a slot in the finger 30 on a pin 36. When in normal position, as shown, the snap lever 35 is located so that it is in the path of lever 10 to prevent the same from entering the slot in finger 30 without moving the snap lever 35. A plunger 37 holds the snap lever in this normal position due to the pressure of the spring 38. A projection 39 on the snap lever 35 rests normally against the side of the plunger 37, definitely limiting its motion toward the control lever 10 as shown.

It will be seen, particularly from Figure 2, in which the same reference numerals have been applied to like parts shown in Figure 1, that the leverage of the snap lever 35 is, in normal position, very short. This short leverage is designated in Figure 2 by numeral 100. It will be understood, of course, that this leverage may be designed according to need as desired. It can be made shorter than shown in Figure 2, in fact, it may be designed so as to be practically perpendicular against the pivot pin 96 or as near to it as possible and still be operable.

When the control lever 10 is shifted toward the left and engages the snap lever 35, it will initially strike against the snap lever somewhat as if striking a solid stop. This is due to the short leverage of the snap lever as above explained and may be determined by properly designing the leverage so as to resist the shift lever in the desired manner.

Now, assuming the leverage of the snap lever to be very short, so that the shift lever strikes against the same as against a dead stop, the shift may be accomplished by striking the snap lever a quick sharp blow to initiate its upward movement under the continued force of the shift lever. As the snap lever turns up the leverage quickly becomes greater, thus lightening the pressure necessary for displacing the snap lever and moving the shift or control lever into the desired position against only a very light spring pressure. Numeral 101 in Figure 2 designates the leverage of the snap lever in its displaced position with the shift lever engaging the slot in the shift fingers as indicated in dotted lines.

More pressure is, therefore, required to move the snap lever 35 initially from its normal position than is necessary after the same has been displaced as described above. To engage the slot in the shift finger with the lower end of control lever 10 requires, therefore, an actual effort of the operator and prevents the moving of the shift fingers unless actually desired by the operator.

In conclusion, it will be seen from the foregoing description that I have provided a novel and improved snap lock mechanism for restraining the control lever from engaging certain shift fingers unless an effort is made to do so, comprising a pivotally mounted snap lever cooperating with the corresponding shift fingers and disposed in the path of the control lever, and spring operated plunger means for holding the snap lever in a certain position, the leverage of the snap lever being such as to multiply the force of the plunger means when the shift lever is moved initially into contact with the snap lever, whereupon the leverage of the latter increases under the continued action of the shift lever, reducing the pressure required for displacing the shift lever and for moving the same into engagement with said shift fingers.

It will be understood that I have enumerated above only the important features in a general manner, and that there are several dependent features which are not specifically mentioned but inherent in the disclosed structure.

It will also be understood that changes and modifications might be devised by following the teachings of my disclosure, and it is, therefore, not my intention to limit myself precisely to the structure explained and illustrated, either in details or in its entirety, but to include and make use of all such modifications and changes which fall within the scope and meaning of the following claims. I have defined and expressed in those claims what I consider my invention and new in the art.

I claim:

1. In combination with a transmission of the class described, a shifter rod, a bracket thereon, a control lever for engaging said bracket to shift said rod, and shift restraining means attached to said bracket in the path of said control lever, comprising a pivotally mounted lever and spring operated means for opposing the force of said control lever with gradually decreasing force when said control lever is operated to engage said bracket.

2. In combination, a plurality of shifter rods, a control lever for selectively and individually shifting said rods, a bracket attached to each of said rods for engagement by said lever, and shift restraining means attached to one of said brackets, comprising a pivotally mounted locking lever disposed in the path of said control lever, and yieldable means for holding said locking lever in normal position, the leverage of said locking lever being such as to oppose the action of said control lever with gradually decreasing pressure.

3. In combination with a gear shift mechanism having a shifter rod, shift fingers mounted thereon, a movable shift lever for engaging said shift fingers, a movable snap lever cooperating with said shift fingers and disposed in the path of said shift lever for restraining the movement thereof with variable pressure, said pressure being determined by variable leverage of said snap lever during the movement thereof under the action of said shift lever.

4. In combination with a gear shift mechanism having a shifter rod, means having shift fingers mounted on said rod, a movable shift lever for engaging said fingers, a movable snap lever pivotally mounted on said rod and having a lateral extension meeting said shift lever almost at right angles, and resilient means resisting pivotal movement of said snap lever, said lever being adapted to vary its resistance to said shift lever during movement thereof under the action of the shift lever.

5. In combination with a gear shift mechanism having a shifter rod, means mounted on said rod and provided with shift fingers, a movable shift lever for engaging said fingers to move the shifter rod, a movable snap lever pivotally mounted on said means, the snap lever having an extension directed toward the shift lever and adapted to contact with the same at a point above a line passing through the pivotal axis of the snap lever and normal to the shift lever whereby movement of the shift lever toward the snap lever rocks the same upwardly, and spring means yieldingly resisting pivotal movement of the snap lever.

6. In combination with a gear shift mechanism having a gear shift lever, means for resisting movement of the lever with a variably decreasing force comprising a pivotally mounted snap lever having one end rounded and adapted to be contacted by said shift lever, the length of said end of the snap lever and the pivotal axis of the latter being so arranged that at the beginning of the movement of the shift lever toward said axis the snap lever is substantially at right angles with respect to the shift lever, continued movement of the shift lever swinging the snap lever upwardly, and a spring pressed plunger for biasing the snap lever to resist movement of the shift lever.

7. In combination with a gear shift mechanism having a shifter rod and a control lever for operating the same, yielding means disposed in the path of said control lever for restraining the movement thereof with a variably decreasing force, said means comprising a snap lever pivoted to said rod and having an extension adapted to contact with said control lever at a point slightly above the pivotal axis of the snap lever, a spring pressed plunger for biasing the snap lever, and stop means co-operating with the plunger for positioning the snap lever so as to initially oppose the movement of the control lever with a force which decreases as the resistance to pivotal movement of the snap lever is overcome.

8. In combination with a gear shift mechanism having a shifter member and a control lever for operating the same, yielding means disposed in the path of said control lever for restraining the movement thereof with a variably decreasing force, said means comprising a pivotally mounted snap lever, a spring pressed plunger for biasing the snap lever, said snap lever being adapted to be contacted by said control lever and having an extension adapted to engage said spring pressed plunger to shift the same axially, the angular relation between said extension and the axis of movement of said spring pressed plunger being such that a given angular displacement of the pivoted snap lever causes a greater displacement of said plunger during the initial movement of the snap lever.

ROBERT LAPSLEY.